United States Patent Office 3,391,011
Patented July 2, 1968

3,391,011
BASIC FUSED REFRACTORY MATERIAL
Allen M. Alper and Robert N. McNally, Corning, N.Y., assignors to Corhart Refractories Company, Louisville, Ky., a corporation of Delaware
No Drawing. Filed July 13, 1966, Ser. No. 564,750
3 Claims. (Cl. 106—59)

ABSTRACT OF THE DISCLOSURE

Basic fused refractory material characterized by good resistance to basic ferruginous slag and good high temperature strength, and consisting of, by weight, at least 85% MgO, 1 to 10% of iron oxide computed as FeO, 1 to 4.5% $Cr_2O_3$, 0.5 to 5% $Al_2O_3$, less than 1% CaO and 0 to 1.5% $SiO_2$.

---

It was suggested in United States Patent 2,113,818 that MgO base fused refractory material formed of magnesium oxide and iron oxide could be suitably used in the metallurgical industry where chemically basic slags are employed. While it has been found that relatively small amounts of iron oxide (e.g. 1–15 wt. percent) combined with magnesia in fused cast refractory yields a product with very good corrosion resistance to molten basic ferruginous slags and slag vapors having a high lime-to-silica ratio, these products suffer a rather poor high temperature strength, which is much lower than the high temperature strength of substantially pure fused cast magnesia. It appears possible to again raise the high temperature strength up to that of substantially pure fused cast magnesia by further increasing the amount of iron oxide to 20 wt. percent and above, but these larger quantities of iron oxide adversely decrease the slag corrosion resistance to a very undesirable degree.

It is recognized that elevated temperature strength of refractories is one of several important factors governing the service life span of refractories. High temperature strength can be quite important in such refractory applications as working linings in basic oxygen steelmaking furnaces or vessels, which linings at high temperatures are subjected to violent impacts by solid charge materials and to severe abrading and washing action of the violently agitated steelmaking contents of the furnaces or vessels. It can also be important because of its influence or resistance to spalling and the ability of refractories to withstand internal stresses created by thermal gradients or changes in the refractories.

We have discovered that fused refractory material formed of magnesium oxide and iron oxide, and having good basic slag resistance, can be modified so as to include small amounts of chromium oxide and aluminum oxide, while maintaining good slag resistance, and thereby yield substantially improved high temperature strength that will make the refractory more practical for service in such applications as working linings in basic oxygen steelmaking furnaces or vessels. The new fused refractory material according to our invention consists of, by weight, at least 85% MgO, 1 to 10% (and preferably 2 to 6%) iron oxide computed as FeO, 1 to 4.5% $Cr_2O_3$, 0.5 to 5% $Al_2O_3$, less than 1% CaO and 0 to 1.5% $SiO_2$. As will be seen below, our invention provides especially good high temperature strength when $Cr_2O_3$ and $Al_2O_3$ are at least 2% by weight.

Our new fused refractory material can be made by conventional practices, including melting of premixed batch charges in an electric arc furnace and either casting the molten material into suitable preformed molds (e.g. graphite) or forming it into grain. Of course, as in the past, the mold can also be the furnace melting chamber and, in that case, the molten material is solidified in such mold without the necessity of a pouring operation. The resulting monolithic castings and grain particles are composed to a vast degree essentially of periclase crystals containing iron oxide (predominantly as FeO) and, in some cases, significant amounts of the oxides of chromium and aluminum in solid solution in the periclase lattice. While the usual and more economical form of iron oxide raw materials are composed mainly of $Fe_3O_4$ or $Fe_2O_3$, the reducing conditions of melting with graphite electrodes cause considerable reduction of such iron oxides to the FeO state. Generally we find that the major amount of iron oxide in the cast products is FeO and the remaining minor proportion is $Fe_2O_3$. Extremely little complex magnesia spinel (which consists essentially of MgO, $Cr_2O_3$ and $Al_2O_3$, and also FeO and/or $Fe_2O_3$ in some cases) is formed in the cast products, either intergranularly between the periclase crystals or as finely divided precipitate intragranularly within the periclase crystals. The lack of an appreciable amount of the lower melting complex spinel greatly retards grain boundary corrosion by slag and slag vapors, and, as a complementary result, it also greatly retards subsequent erosion of periclase crystals.

The limitation on the $SiO_2$ content, and also on the CaO content in the presence of $SiO_2$, is particularly important to maintaining the good corrosion resistance of the cast products to hot basic slags and slag vapors. Keeping $SiO_2$ from exceeding 1.5 wt. percent avoids the formation of the significantly lower melting phase of forsterite intergranularly between the periclase crystals, where it could be easily corroded out by the slag thereby allowing greater attack on and erosion of the periclase crystals. CaO readily combines with $SiO_2$ and FeO with the tendency to convert forsterite to another low melting phase of olivine. Thus CaO can contribute to the formation of a less corrosion resistant intergranular phase, and to assure avoidance of such phase, we find that the CaO (which could also be BaO and/or SrO for this invention, and CaO is used herein with that meaning) content should be kept below 1 wt. percent.

A better appreciation of the invention will be gained by the specific illustrations set forth in the table, which includes three examples of this invention (Melt Nos. 1–3) and three examples of the prior art (Melt Nos. 4–6). Typical analyses, on a weight basis, of the raw materials employed in the batch compositions are as follows:

Magnesite (calcined): 98.51% MgO, 0.86% CaO, 0.28% $SiO_2$, 0.22% $Fe_2O_3$, 0.13% loss on ignition.

Magnetite (concentrate): 98.71% $Fe_3O_4$, 0.77% $SiO_2$, 0.24% $Al_2O_3$, 0.20% $TiO_2$, 0.08% MgO.

Chromic oxide (green pigment grade): 99.75% $Cr_2O_3$.

Alumina: 99.2% $Al_2O_3$, 0.45% $Na_2O$, 0.03% $Fe_2O_3$, 0.02% $SiO_2$, 0.3% loss on ignition.

For economy and convenience, the product compositions have been calculated from the respective batch analyses, although there usually is some deviation found in actual chemical analysis (e.g. higher values for MgO and lower values for FeO and $SiO_2$), but not sufficient to alter the relationships of any example to the definition of this invention set forth above and in the claims. All the iron oxide contents in the products are reported as FeO, which is commonly the valence state of a majority of the iron oxide in the products with the minor remainder being $Fe_2O_3$.

It can be seen from the table that the very small additions of $Cr_2O_3$ and $Al_2O_3$ in Melt Nos. 1–3 provide greatly improved hot strength, as indicated by the average data of modulus of rupture in flexure (MOR) at 1340° C. after the samples were held at that temperature for one hour, as compared with Melt Nos. 3 and 4. As mentioned previously, some increased hot strength can be obtained by increasing the iron oxide content, but only with a detrimental loss in basic high-lime slag corrosion resistance, as idicated by the high degree of slag cut in our routine slag corrosion test.

The slag resistance test comprises placing 1½" x 1" x ½" samples in a heated furnace having a predominantly CO atmosphere. At 1700° C. for about two hours or so, the samples were passed, with one of their largest surfaces facing upward, through a downwardly directed stream of molten basic slag droplets at a substantially uniform rate of 72 times per hour until 2000 grams of slag were employed. The slag had the following approximate batched composition, in percent by weight: 23.75% $Fe_2O_3$, 25.94% $SiO_2$, 40.86% CaO, 6.25% MgO and 3.20% $Al_2O_3$. At the end of the test, the average thickness of the most deeply cut parts of the samples was measured and compared with the original ½" thickness. The results given in the table express this comparison as a percentage change in thickness.

It is interesting to note that the modulus of rupture of fused cast commercially pure MgO products at 1340° C., after one hour at temperature, generally average about 1000 p.s.i. From this fact, the detrimental effect of iron oxide on the hot strength of prior MgO-iron oxide fused cast refractory is plainly evident. Accordingly, the present invention makes it possible to gain the known advantages of minor quantities of iron oxide in MgO base fused cast refractory while avoiding the detrimental effect of such iron oxide on high temperature strength.

TABLE

| | Melt Number | | | | | |
|---|---|---|---|---|---|---|
| | 1 | 2 | 3 | 4 | 5 | 6 |
| Batch Composition by Weight: | | | | | | |
| Magnesite | 95 | 90 | 91 | 95 | 85 | 80 |
| Magnetite | 3 | 8 | 5 | 5 | 15 | 20 |
| Chromic Oxide | 1 | 1 | 2 | | | |
| Alumina | 1 | 1 | 2 | | | |
| Product Composition (calculated from batch), by weight: | | | | | | |
| MgO | 93.7 | 88.8 | 89.8 | 93.7 | 83.9 | 78.9 |
| FeO | 3.2 | 8.1 | 5.1 | 5.2 | 15.0 | 19.9 |
| $Cr_2O_3$ | 1 | 1 | 2 | | | |
| $Al_2O_3$ | 1 | 1 | 2 | | | 0.1 |
| CaO | 0.8 | 0.8 | 0.8 | 0.8 | 0.7 | 0.7 |
| $SiO_2$ | 0.3 | 0.3 | 0.3 | 0.3 | 0.4 | 0.4 |
| Average MOR at 1,340° C. (p.s.i.) | 1,360 | 821 | 3,020 | 175 | 280 | 845 |
| Slag Cut, percent | 31 | 25 | 26 | 13 | 17-29 | 50 |

We claim:

1. A fused refractory material consisting of, by weight, at least 85% MgO, 1 to 10% of iron oxide computed as FeO, 1 to 4.5% $Cr_2O_3$, 0.5 to 5% $Al_2O_3$, less than 1% CaO and 0 to 1.5% $SiO_2$.

2. The fused refractory material of claim 1 wherein the $Cr_2O_3$ and $Al_2O_3$ are each 2 to 4% by weight.

3. The fused refractory material of claim 1 wherein the iron oxide, computed as FeO, is 2 to 6% by weight.

References Cited

UNITED STATES PATENTS 3,250,632   5/1966   Alper et al. _____ 106—60

TOBIAS E. LEVOW, *Primary Examiner.*

JAMES E. POER, *Examiner.*